April 29, 1930.　　　A. P. BRUSH　　　1,756,178
VIBRATION DAMPENER
Filed Aug. 26, 1925　　　2 Sheets-Sheet 1
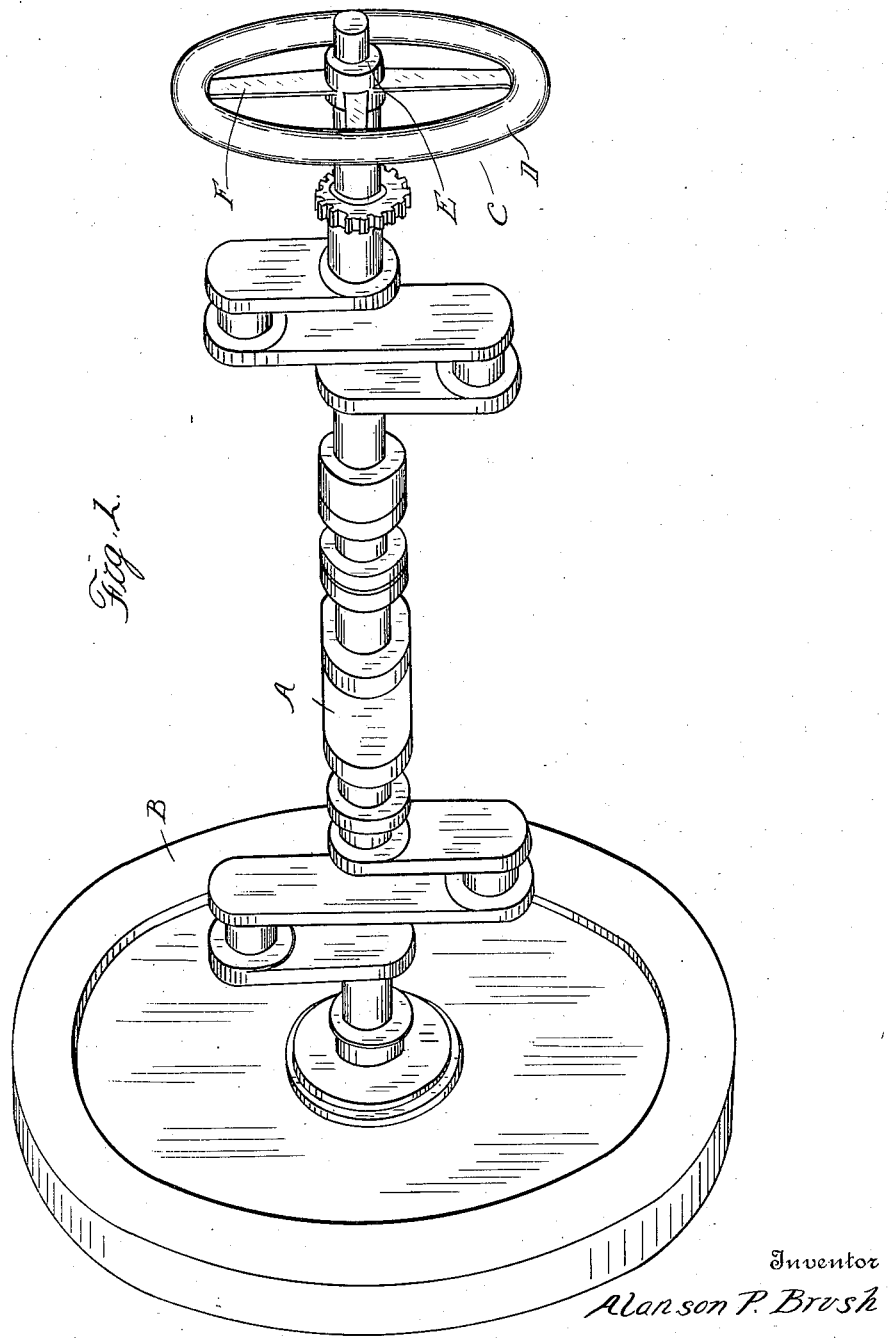
Inventor
Alanson P. Brush
By Whittemore Hulbert Whittemore
 & Belknap　Attorneys April 29, 1930.  A. P. BRUSH  1,756,178
VIBRATION DAMPENER
Filed Aug. 26, 1925   2 Sheets-Sheet 2
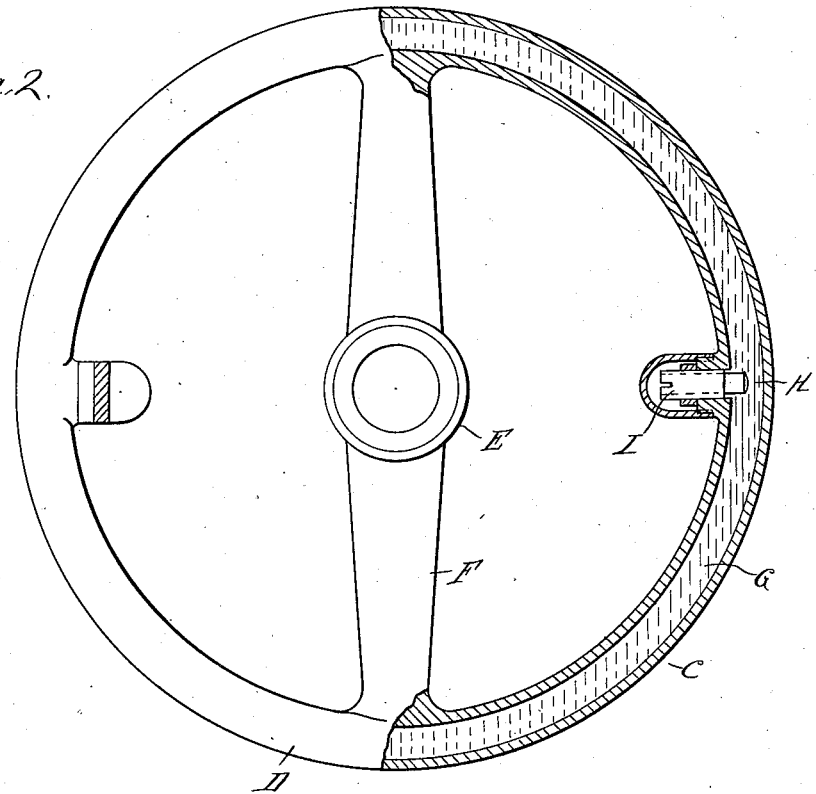
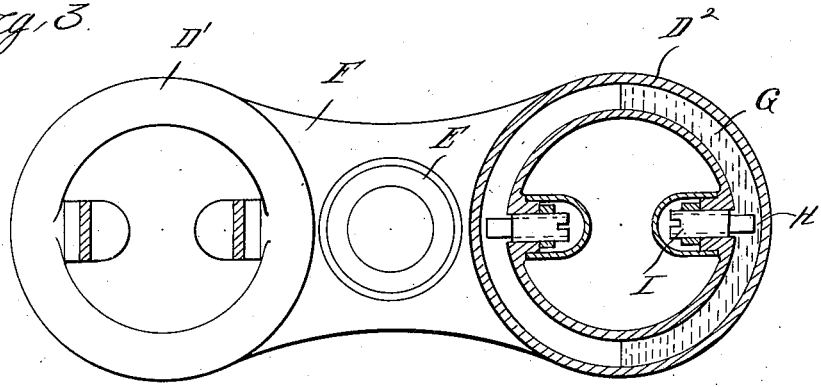
Inventor
Alanson P. Brush
By Whittemore Hulbert Whittemore
& Belknap   Attorneys Patented Apr. 29, 1930

1,756,178

UNITED STATES PATENT OFFICE

ALANSON P. BRUSH, OF DETROIT, MICHIGAN

VIBRATION DAMPENER

Application filed August 26, 1925. Serial No. 52,660.

The invention relates to vibration dampeners and more particularly to that type applicable to revolving members which are driven by intermittent power impulses such, for instance, as the crank shaft of an engine. With such mechanisms it is usual to provide a fly wheel or equivalent device usually located at one end of the shaft and having a sufficient inertial element to absorb the power increments and to minimize the variations in speed. Inasmuch, however, as the crank shaft is not an absolutely rigid body, the successive impulses resisted by the inertia of the fly wheel at one end of the shaft and unrestricted at the other, will cause relative oscillations of the two ends. Various devices have been used for checking or dampening these oscillations and the present invention consists in the novel means used for this purpose.

To successfully dampen oscillations of the character above described, it is necessary to absorb the power by the performance of work. Therefore, any construction which depends solely upon inertia will be ineffectual. On the other hand where work is performed as, for instance, by absorption of energy through frictional resistance, it is difficult to maintain uniform working conditions. As a consequence, many devices which may successfully dampen oscillations for a time will later lose their effectiveness or require frequent adjustment to maintain an operative condition. I have, therefore, devised a construction in which the power absorption means is proportional to the accelerations and when once adjusted, will not vary to any material extent throughout long periods of operation.

Generally described, my improvement comprises a fluid which furnishes the inertia element, a container for this fluid carried by the revolving member and means for frictionally resisting the displacement of the fluid during positive or negative acceleration of the container. The fluid which I employ is preferably mercury on account of its high specific gravity and low viscosity, but other fluids may be substituted therefor if the total mass is sufficient.

My invention may be applied to various specific constructions but as shown in the drawings;

Figure 1 is a diagrammatic perspective view showing an engine crank shaft and fly wheel to which my improved dampener is applied.

Figure 2 is a section through the dampener in the plane of rotation thereof.

Figure 3 is a similar view illustrating a modified construction.

In detail A represents an engine crank shaft; B a fly wheel at one end of said shaft and C my improved dampener applied to the opposite end of the shaft.

As shown in Figure 2, the dampener C comprises an annular casing D arranged concentric with the axis of the shaft A and mounted thereon by suitable means such as the hub E and spokes F. This annular housing contains a volume of mercury or other fluid indicated at G which is of sufficient mass to form the inertial element. I also preferably arrange a restriction H at one or more points for throttling the annular passage and introducing the requisite friction element. This restriction may be adjustable as by means of the screw threaded stem I which permits of regulation.

With the construction as thus described, when the engine is in operation the successive power impulses transmitted to the shaft through the cranks thereof will cause alternating positive and negative accelerations. The inertia of the fly wheel will absorb the greater part of the energy but as previously described, the elasticity of the shaft would permit relative oscillations of the opposite ends thereof. However, the inertia of the fluid within the annular casing D will cause a lag or movement of the same relative to said casing and the wall friction together with the frictional resistance produced by the throttle will absorb a portion of the energy. This, by suitable adjustment, may be made to counterbalance the oscillations in the shaft so as to minimize or completely destroy the same.

In the modified construction shown in Figure 3 instead of forming an annular container concentric with the axis of the shaft, the inertial fluid is held in an eccentric container. As specifically shown, two of such containers D' and D² are arranged upon diametrically opposite sides of the shaft to counterbalance each other, each container having a quantity of mercury or other fluid therein. With such constructions, positive and negative accelerations cause an oscillation of the mercury in each of the eccentric containers and by throttling or otherwise restricting the passage the energy will be, to a great extent, dissipated.

The specific constructions described are illustrative of many modified constructions in all of which the same principle is employed.

What I claim as my invention is:

1. The combination with a rotary shaft, of a fly wheel mounted thereon, a vibration dampener mounted on the other end of the shaft comprising a continuous annular chamber concentric with the axis of the shaft, a low viscosity liquid within said chamber and a local constriction at one point within the chamber for resisting the flow of the fluid therein.

2. In combination with a crank shaft for delivering power, a fly wheel at the power delivery end of the shaft, a torsional oscillation dampener at the other end of the shaft comprising an annular chamber arranged concentric with the axis of the shaft, a low viscosity liquid within said chamber and a local constriction at one point within said chamber whereby oscillations due to the torsional flexing of the shaft are resisted.

In testimony whereof I affix my signature.

ALANSON P. BRUSH.